United States Patent [19]

Thomas et al.

[11] Patent Number: 4,984,464
[45] Date of Patent: Jan. 15, 1991

[54] ACCELERATION RESPONSIVE CIRCUIT FOR ACTUANTINC VEHICLE EQUIPMENT

[75] Inventors: Alan D. Thomas, Reading; Hoshmand Kalami, Cyncoed, both of Great Britain

[73] Assignee: First Inertia Switch Limited, Fleet, England

[21] Appl. No.: 424,205
[22] PCT Filed: Mar. 31, 1988
[86] PCT No.: PCT/GB88/00257
§ 371 Date: Oct. 13, 1989
§ 102(e) Date: Oct. 13, 1989
[87] PCT Pub. No.: WO88/07461
PCT Pub. Date: Oct. 6, 1988

[30] Foreign Application Priority Data
Apr. 1, 1987 [GB] United Kingdom ............... 8707754

[51] Int. Cl.⁵ ............... G01P 15/08; B60R 21/00; B60R 21/32; G08B 21/00
[52] U.S. Cl. ................... 73/517 R; 280/735; 340/669; 180/282
[58] Field of Search ............ 324/162; 280/735; 73/517 R; 180/283; 340/669

[56] References Cited

U.S. PATENT DOCUMENTS 3,459,053  8/1969  Grimme et al. ................. 73/517
4,410,875 10/1973  Spies et al. ..................... 280/735

Primary Examiner—Walter E. Snow
Attorney, Agent, or Firm—Larson & Taylor

[57] ABSTRACT

An acceleration responsive circuit is provided including an electronic accelerometer having an analog electrical signal output representative of detected acceleration which signal is inputted into an analog/digital converter to provide a digital signal in response to the accelerometer output together with an integrator for integrating the digital signal and, in the event a threshold acceleration has been exceeded, an operating circuit is energized to activate selected equipment such as, for example, the inflator for an airbag.

5 Claims, 1 Drawing Sheet

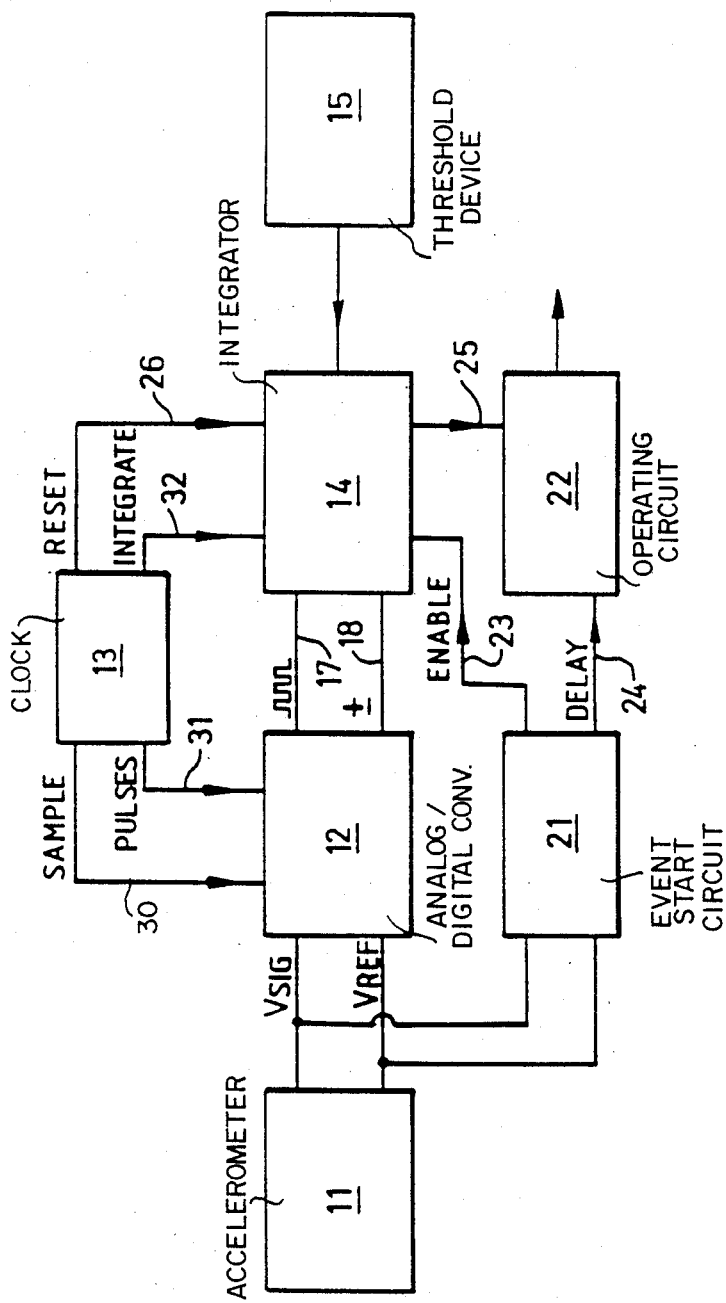

ACCELERATION RESPONSIVE CIRCUIT FOR ACTUANTINC VEHICLE EQUIPMENT

When a body is subject to excessive acceleration, such as a road vehicle in a crash, it is often desired to operate certain equipment automatically. Most acceleration responsive devices Specification No. 119064, in which a conductive sphere which is normally retained in position by a magnet is caused by the excessive acceleration to move to a position in which it bridges two contacts, completing a circuit to operate the desired equipment. An analogue electrical equivalent of the inertia sensor has been proposed, in which an electrical signal proportional to the acceleration sensed is generated and integrated in order to provide an output signal from the integrator representing the velocity change during the integration period. When this velocity signal exceeds a predetermined threshold, the desired equipment is actuated.

Although such electronic equipment is an improvement on the mechanical inertia sensors, it is subject to error since each of the components in the electronic circuit has certain tolerances, all of which can contribute to the error in the final signal, which is therefore not reliable. Analogue equipment is also susceptible to interference from radio frequencies and electromagnetic disturbances.

The present invention proposes to improve acceleration responsive devices which comprise an electronic accelerometer adapted to provide an analogue electrical signal output representative of acceleration detected together with an integrator and an operating circuit enabled by the integrator output above a predetermined level, the improvement comprising an analogue/digital converter ro provide a digital signal in response to the accelerometer output representative to the acceleration detected, the integrator being arranged to integrate the digital signal. Much better accuracy is available with digital equipment and the setting of thresholds is made much easier.

An optional feature of the invention includes an accelerometer which provides two voltage outputs, one representing the acceleration detected and the other representing zero acceleration, thus enabling any errors due to temperature changes or aging of components to be eliminated. Preferably the two outputs from the accelerometer are individually converted to digital signals and then subtracted one from the other to provide an input to the integrator.

The invention may be applied to actuation of vehicle safety equipment in a crash, such as the inflation of an air bag to form a cushion between the driver's chest and the steering wheel. In order that the air bag is not inflated by false alarms, the invention preferably includes a threshold detector responsive only to signals representing detected accelerations over a given level (so as in the vehicle safety application to ignore accelerations experienced during normal driving) and also a delay circuit to prevent actuation of the operating circuit until an acceleration over the predetermined level has been experienced from a given time (so as in the vehicle safety application to exclude short-term high accelerations caused for example by hitting a kerb or a pot-hole or by hammering during servicing of the vehicle). The drawing shows a block diagram of the acceleration responsive circuit of the present invention.

An electronic accelerometer 11 provides two outputs, Vsig being a voltage representing the detected acceleration and Vref comprising a voltage representing a zero reference level. The accelerometer 11 is provided with both a generator of a reference voltage and an acceleration detector which generates the signal voltage.

The Vsig and Vref signals are passed to an analog/digital converter 12 where the two signals are subtracted at a sampling rate which depends upon the control signal from line 30 and the difference between the voltages is converted to a pulse train with a pulse repetition frequency which is dependent upon the signal on line 31. Line 18 provides a signal indicating whether the acceleration is positive or negative. The integrator integrates the signal from line 17, also under the control of a signal line 32 from clock 13, adding or subtracting the integrated signal to the running total according to the signal on line 18. The integrator output is thus a velocity signal which is compared with an adjustable threshold device 15, and when it exceeds a predetermined value, a contrcl signal passes to an cperating circuit 22.

The signal on line 18 prevents the operating circuit responding to rapid oscillations—with positive and negative accelerations—since no prolonged velocities will be built up.

An event start circuit 21 receives the two signal outputs from the accelerometer and when the difference of the signals exceeds a given threshold, provides a signal on line 23 representing the start of an event. This signal enables the integrator, so that it only begins to integrate the acceleration signals received when excessive acceleration is experienced and the integrator is disabled during normal accelerations experienced during driving. The circuit 21 also provides a hold off signal on line 24 to the operating circuit 22 so that it will not respond to a signal from the integrator indicating that a velocity change greater than the threshold value set has been experienced until it has been experienced for a predetermined time such as 10 m/secs, in order to eliminate response to short-term shocks. If the integrator 14 indicates on line 25 that the threshold has been exceeded after the hold off period, then the cperating circuit 22 is enabled and the selected equipment is energised, for example the inflator for the arr bag is activated. A reset signal is supplied on line 26 from the clock 13 to the integrator 14 to reset the integrator 14 and the event start circuit 21 after a predetermined time such as 100 m/sec, since the device is required not to respond to long term gentle accelerations, but only to mid-term nigh accelerations.

Since air bags take about 30 m/secs to inflate, a threshold velocity is set into device 15 to provide an energising signal to the circuit 22 at such a time that the air bag will be fully inflated before the driver hits the steering wheel in any crash situation. This time is determined by experiments, for example by crashing a vehicle at speed.

The threshold velocity set in the circuit 15 is a digital value which can be set permanently during the manufacture of the electronic equipment, or it may adjusted for example by connecting or disconnecting circuit based links.

In the event of a crash of a road vehicle, it may be desired to operate different equipment when the acquired velocity change exceeds different threshold levels, in which case a plurality of threshold detectors 15 and a plurality of activating circuits 22 are provided, one of each for each equipment. When the equipment includes pyrotechnic devices which may not fire on receipt of the first signal, the activating circuit may be arranged to provide a plurality of signals in response to the activating signal from the integrator, in order to ensure that the pyrotechnic device fires as soon as possible when the velocity change exceeds the threshold and the hold off signal has ceased.

The operating circuit 22 is thus only energised when the following conditions are satisfied:

1. An acceleration greater than a first threshold has been experienced at time T0.
2. The velocity signal formed by integrating the acceleration signals since time T0 exceeds a second threshold after time T1 but before time T2, (T1-T0) being the hold off period and T2-T0 being the crash duration period.

We claim:

1. An acceleration responsive device comprising an electronic accelerometer providing an analog voltage output representative of acceleration detected and a reference voltage output representative of zero acceleration, an analogue/digital converter receiving the analogue and reference voltage outputs to digital signals and subtracting the digital signals from each other to provide resultant digital signal outputs and an integrator for integrating the resultant digital signals.

2. A device as claimed in claim 1 and further including a threshold detector to inhibit said analogue electrical signal output until a predetermined acceleration is reached.

3. A device as claimed in claim 2 and further including a line delay to inhibit said analogue voltage output until a predetermined acceleration is reached for a predetermined period.

4. A device as claimed in claim 1 and further including means to reset the device a predetermined time after the integrator starts to integrate the analogue voltage output.

5. An acceleration responsive device according to claim 1 wherein the device is adapted to be installed in a road vehicle.

* * * * *